Nov. 8, 1949      C. R. PETRI      2,487,271
DOUGHNUT MACHINE
Filed Oct. 9, 1946
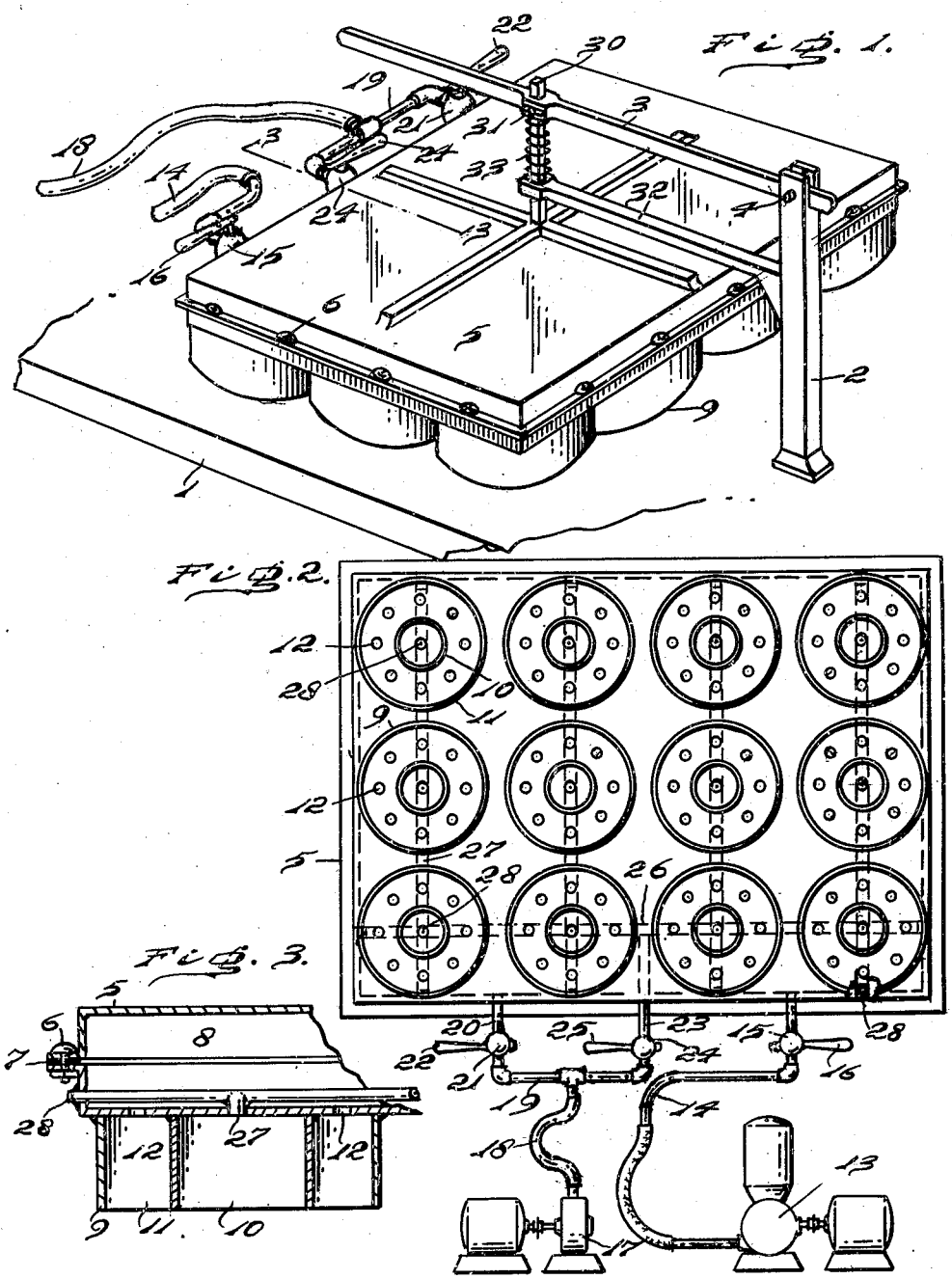
INVENTOR.
Clarence R. Petri
BY
Herbert S. Fairbanks
ATTORNEY.

Patented Nov. 8, 1949

2,487,271

UNITED STATES PATENT OFFICE 2,487,271

DOUGHNUT MACHINE

Clarence R. Petri, Miami, Fla.

Application October 9, 1946, Serial No. 702,339

4 Claims. (Cl. 107—24)

The object of this invention is to devise a novel doughnut machine which will cut out the doughnut blanks, remove the centers while retaining the blanks in the cutters, and thereafter remove the blanks for transfer to the frying kettle.

The dough is rolled to the required thickness on a dough board to form a sheet of dough and the dough board is then placed beneath the cutters. The cutters are moved to cut the dough into blanks. The centers of the blanks are ejected by compressed air and the dough board with the centers and excess dough removed from beneath the cutters. The blanks which have been retained in the cutters up to this time are then removed from the cutters by compressed air on to frying racks for transfer to the frying kettle or directly to the frying kettle, which latter is of conventional construction.

With the foregoing and other objects in view as will hereinafter clearly appear, my invention comprehends a novel doughnut machine, and more particularly novel mechanism for cutting out the doughnut blanks for transfer to a frying kettle.

It further comprehends a novel construction and arrangement of cutters and novel means for retaining the blanks in the cutters and for ejecting the centers and blanks from the cutters.

For the purpose of illustrating the invention, I have shown in the accompanying drawings a preferred embodiment of it which in practice will give satisfactory and reliable results. It is, however, to be understood that the various instrumentalities of which the invention consists can be variously arranged and organized, and the invention is not limited to the exact arrangement and organization of these instrumentalities as herein set forth.

Figure 1 is a perspective view of a doughnut machine, embodying my invention.

Figure 2 is a bottom plan view, partly schematic.

Figure 3 is a section on an enlarged scale, the section being taken substantially on line 3—3 of Figure 1.

Similar numerals indicate corresponding parts.

Referring to the drawings:

The machine has a base 1 from which rises a post 2 on which a lever 3 is pivoted at 4. The lever 3 carries a cutter head 5 having flanged sections secured together in sealed relationship by fastening devices 6 and a gasket 7. The sections are chambered to form a combined suction and pressure chamber 8, see Figure 3. Cutters 9 depend from the bottom of the lower section of the head and comprise a central ring or other shape 10 and an outer ring or other shape 11. The space between an inner and outer ring of a cutter communicates with the chamber 8 by means of a desired number of openings or ports 12.

The chamber 8 is in communication with a source of suction supply such as a motor driven vacuum pump 13 by a pipe line 14, a portion of which is of flexible tubing, and a conventional valve 15 in the pipe line at a convenient location for use is provided with a handle 16, which when depressed causes the opening of the valve, the valve closing by spring pressure.

A motor driven pressure pump 17 has a flexible tubing 18 leading from its pressure discharge to a manifold 19, one branch 20 of which opens into the chamber 8, and is provided with a valve 21, similar in construction and operation to that of the valve 15, and provided with a handle 22. The other branch 23 of the manifold has a valve 24, similar to the other valves, and provided with a handle 25. The branch 23 leads to a pipe 26 communicating with pipes 27 at right angles thereto. The pipes 26 and 27 communicate with openings or ports 28 through the bottom of the head and leading to the space within the inner rings 10. The pipes 26 and 27 have removable plugs 29 at their ends so that, in case the pipes become clogged, the plugs can be removed and a wire brush passed through the pipes.

The cutter head 5 has a post 30 having a pin and slot connection 31 with the lever 3. The post 31 passes through a guide bar 32 on the post 2 and between the bar 32 and the lever 3 is a spring 33 which tends to retain the cutter head 5 in its raised position.

The operation of my novel doughnut cutter and retaining and ejecting mechanism will now be apparent to those skilled in this art and is as follows:

The dough is rolled on a dough board to the required thickness to produce a sheet of dough from which the dough blanks are to be cut. The dough board with the sheet of dough thereon is now placed below the cutter head. The operator presses downwardly on the lever 3 and the doughnut blanks are cut out of the sheet of dough and moves the valve handle 16 of the valve 16 downwardly so that a suction is created in the chamber 8 to retain the dough blanks in their cutters. The head is permitted to move upwardly into its raised position, and the valve 24 opened to cause the compressed air to blow out the centers. The dough board with the centers and excess dough thereon is now removed and replaced by a frying rack, and by opening the valve 21 the compressed air causes the blanks to be ejected from the cutters to the frying rack for removal to the frying kettle.

The contour, number and arrangement of the cutters can be varied as may be desired.

Having thus described my invention, what I claim as new and desire to secure by Letters Patent is:

1. In a doughnut machine, a plurality of cutters, each comprising an inner and an outer ring with a recess between and defined by said rings, means to move the cutters to cut-out centers with the inner rings and blanks with the inner and outer rings, means to pass compressed air into the inner rings to eject the centers, means to effect a suction on the blanks during the ejection of the centers, and means to pass compressed air to said recesses to eject the blanks.

2. In a doughnut machine, a cutter head having a chamber, cutters carried by said head, each comprising an inner and an outer ring with a recess between and defined by said rings and in communication with said chamber, means to normally retain said head in raised position, means to move said head to cause the cutters to cut into the material, means to subject said chamber to suction to retain the cut material in the rings, means to pass fluid under pressure into recesses defined by the inner rings, and means to pass fluid under pressure to said recesses between the inner and outer rings.

3. In a doughnut machine, a series of cutters arranged in rows and each comprising an inner and an outer ring with a recess between and defined by said rings, means to subject said recesses to suction, and means to introduce fluid under pressure into recesses within and defined by the inner rings and into the recesses defined by the inner and outer rings.

4. In a doughnut machine, a support, a cutter head movably carried by said support and having a chamber, cutters on said head comprising inner and outer rings with recesses between and defined by the inner and outer rings and communicating with said chamber, means to subject said chamber to suction, and means to selectively introduce fluid under pressure into the inner rings and into said recesses between the inner and outer rings.

CLARENCE R. PETRI.

REFERENCES CITED

The following references are of record in the file of this patent:

UNITED STATES PATENTS

| Number | Name | Date |
|---|---|---|
| 925,693 | Goodykoontz et al. | June 22, 1909 |
| 1,353,077 | Smith | Sept. 14, 1920 |
| 1,834,012 | Willoughby | Dec. 1, 1931 |
| 2,415,976 | Thorud | Feb. 18, 1947 |